United States Patent [19]
Fletcher et al.

[11] 4,018,532
[45] Apr. 19, 1977

[54] SUN DIRECTION DETECTION SYSTEM

[76] Inventors: James C. Fletcher, Administrator of the National Aeronautics and Space Aministration, with respect to an invention of Louis F. Schmidt, Altadena; George D. Pace, Jr., Sierra Madre, both of Calif.

[22] Filed: Sept. 24, 1975

[21] Appl. No.: 616,472

[52] U.S. Cl. .................. 356/141; 250/211 K; 250/203 R; 356/152; 356/172
[51] Int. Cl.² .............................. G01B 11/26
[58] Field of Search .......... 356/141, 152–155, 356/172; 250/211 K, 203 R

[56] References Cited
UNITED STATES PATENTS

| | | | |
|---|---|---|---|
| 3,936,187 | 2/1976 | Momose | 250/211 K |
| 3,951,550 | 4/1976 | Slick | 356/141 |

*Primary Examiner*—Maynard R. Wilbur
*Assistant Examiner*—S. C. Buczinski
*Attorney, Agent, or Firm*—Monte F. Mott; Paul F. McCaul; John R. Manning

[57] ABSTRACT

A sun direction detection system is disclosed. It includes a housing with a slit, through which a line image of the sun is directed into the housing in a first direction. Placed in the housing is a substrate on which at least one pair of detectors are deposited in a direction perpendicular to the first direction. One of the detectors is an illumination detector consisting of two spaced apart elongated strips with a strip of cadmium sulphide (CdS) deposited therebetween. Whenever the line image impinges the CdS strip, the resistance between the two other strips is relatively low, while being high when the line image is outside the field of view of the illumination detector. Also included is a sun angle detector which consists of a vapor deposited resistor strip connected at one end to +10v and at the other end to −10v. Spaced apart from the resistor strip is an elongated strip of low resistance material acting as an output strip, with a CdS strip between the two strips. When the line image is within the field of view of the sun angle detector, the output voltage at the output strip depends on the position of the line image across the sun angle detector. When the line image is at one end, the output voltage is +10v and when the line image is at the other end, the output voltage is −10v. The field of view of the illumination detector is less than that of the sun angle detector so that the change of resistance of the illumination detector from high to low or low to high occurs when the output voltage is either +10v or −10v, depending on the position of the line image with respect to the two detectors.

14 Claims, 7 Drawing Figures

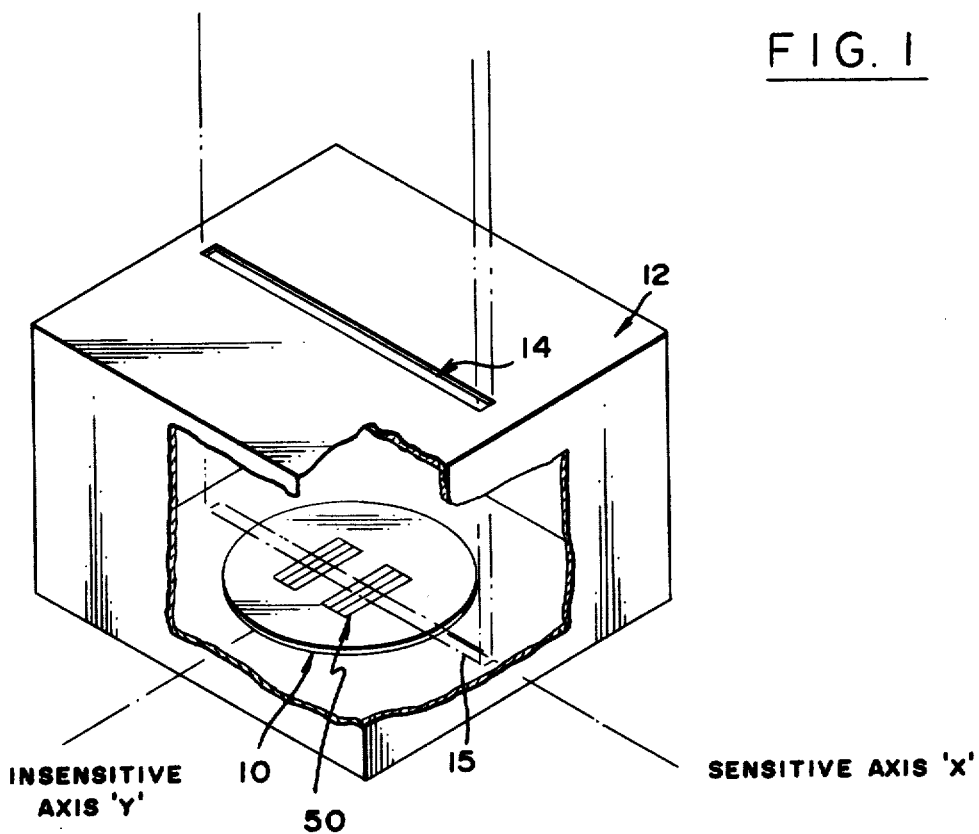
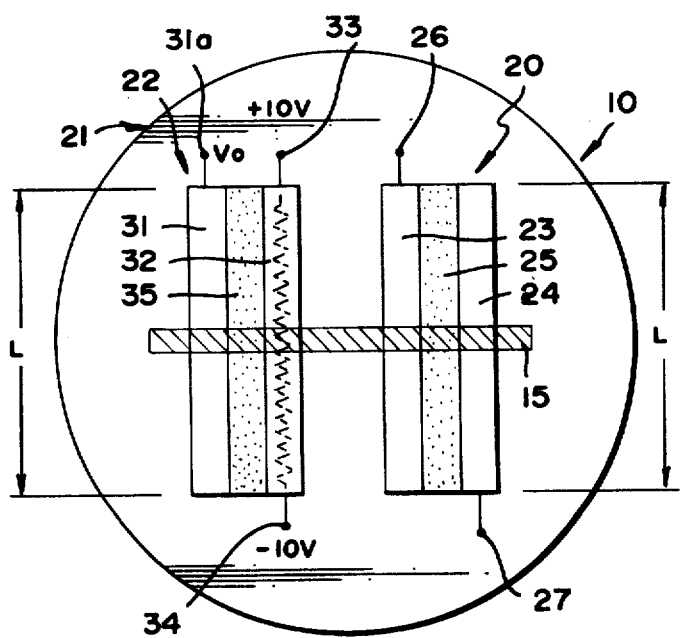

SUN DIRECTION DETECTION SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the invention

The present invention generally relates to energy sensing devices and, more particularly, to an arrangement for detecting energy from an energy radiating source, for use in controlling the attitude of a vehicle, containing the arrangement, with respect to the energy radiating source.

2. Description of the Prior Art

On-course navigation of a space vehicle, such as a space communication satellite or a spacecraft, flying interplanetary missions, depends upon proper orientation of the vehicle on its various axes. The sun is often used as a reference for pitch or yaw axis attitude control. Briefly, the direction of the light from the sun is sensed by light sensors, often referred to as sun sensors, which cause the actuation of attitude control gas jets to achieve and maintain proper vehicle orientation with respect to the sun. In the early stages of space exploration, spacecrafts included a sun sensor system which included sun acquisition sensors or detectors and a sun gate decoder, in order to assure acquisition of the sun direction from any arbitrary vehicle orientation. The cost of fabrication of such sensors is quite high. Furthermore, the sensors must be reconfigured for each new spacecraft design and the circuitry has to be modified for different solar intensities. The elimination of the need for the expensive sun acquisition sensors and the sun gate detector is highly desirable from a cost reduction point of view. Also the elimination of the various sensors would reduce the overall weight of the sun sensor system.

SUMMARY OF THE INVENTION

The sun sensor detection system of the present invention includes an illumination detector which provides a low resistance output whenever the sun is within a selected field of view of the illumination detector. When the sun is outside the field of view of the illumination detector, the resistance of the latter is very high. As the sun enters the illumination detector's field of view from either direction the resistance changes abruptly from high to low. Also included is a sun angle detector with a field of view which is greater than that of the illumination detector. The sun angle detector provides an output voltage which is related to the direction of the sun with respect to the normal direction. A positive output indicates that the sun is off in one direction and a negative output indicates that the sun is off in the opposite direction. When the sun direction is normal to the sun angle detector, its output is zero. Thus, the sun angle detector is basically an off-normal sun angle detector. The sun direction is brought into the field of view of the illumination detector by vehicle attitude control circuitry. Once the sun is in the illumination detector field of view, which is indicated when the resistance of the latter drops sharply from a very high resistance, the output of the sun angle detector is fed to the attitude control circuitry to control the vehicle attitude with respect to the sun as a function of the output of the sun angle detector.

The novel features of the invention are set forth with particularity in the appended claims. The invention will best be understood from the following description when read in conjunction with the accompanying drawings.

BRIEF DESCRIPTION OF THE DRAWINGS

FIG. 1 is an isometric view of the detector arrangement of the present invention with a portion of the housing removed;

FIG. 2 is a top view of an arrangement of two detectors of equal fields of view;

DESCRIPTION OF THE PREFERRED EMBODIMENTS

Figure 3:
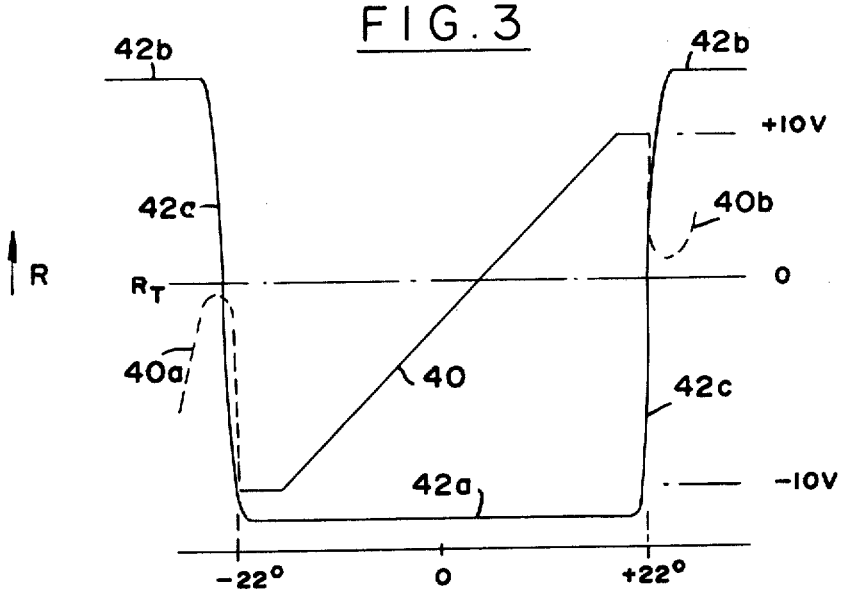
FIG. 3 is a waveform diagram of the output of the detectors shown in FIG. 2 and is useful in explaining the problem solved by the present invention.

Attention is first directed to FIG. 1 wherein a detector assembly 10 is shown housed in a housing 12. The latter has a slit 14 through which sunlight penetrates the housing and after passing through optics, as will be described hereinafter, produces a line image of the sun, hereinafter referred to as the sun image line 15, on the detector assembly 10. As diagrammed in FIG. 1 the detector assembly 10 is mounted so that the X axis is regarded as the sensitive axis, while the insensitive axis is the Y axis.

A simplified top view of the detector assembly 10 is shown in FIG. 2. Briefly, the assembly 10 includes an illumination detector 20 and a sun angle detector 22, which are deposited on a substrate 21. The illumination detector 20 includes two strips 23 and 24 of low resistance material, e.g., aluminum, which are deposited on the substrate. The two strips 23 and 24 are spaced apart from one another with the space being occupied by a strip 25 of photoconductive material, e.g., cadmium sulphide (CdS). The strips 23–25 are of equal length which is designated by L. An electrode or terminal 26 is connected to strip 23 while electrode or terminal 27 is connected to strip 24.

The length L of illumination detector 20 in combination with the distance from the slit 14 to the substrate 21 define the field of view of detector 20. Disregarding the orientation of the detector assembly about the insensitive Y axis, as long as the assembly is oriented about the sensitive X axis so that the sun image line 15 intersects the illumination detector, the portion of CdS strip 25 which is exposed by the sun image line provides a very low resistance between its adjacent strips 23 and 24. Therefore a low resistance is present between terminals 26 and 27. On the other hand, if the assembly 10 is oriented about the X axis so that the sun image line is outside the illumination detector field of view the resistance between terminals 26 and 27 is very high. As the sun image line starts to enter the field of view from either end, the resistance changes very abruptly from the high resistance to the low resistance, which remains relatively constant once the entire width of the sun image line 15 intersects the illumination detector.

The one attitude control system an attitude control unit which is not part of the present invention is included. It automatically turns the vehicle on which the detection system of the present invention is mounted until the sun image line starts entering the field of view of the illumination detector. A trigger resistance value is selected which is between the high resistance, provided by the illumination detector 20, when the sun image line is outside the illumination detector field of view and the low resistance, when the sun image line is within the field of view. As the illumination detector output resistance equals the trigger resistance value it indicates that the sunlight image is entering the illumination detector field of view. When this occurs, the output of the sun angle detector 22 is utilized to further control the vehicle attitude.

As shown in FIG. 2 the sun angle detector 22 consists of a strip 31 of low resistance material, e.g., aluminum, which is connected to an output terminal designted 31a. Spaced apart from strip 31 is a vapor deposited resistor strip 32 which is connected at one end by a terminal 33 to a plus potential e.g., +10v, and at the other end by a terminal 34 to −10v. To distinguish the resistor strip 32 from the other strips a dashed line, in the form of a resistor, is shown therein. A strip 35 of cadmium sulphide is deposited between the resistor strip 32 and strip 31, which serves as the output electrode.

In FIG. 2 the length of the sun angle detector 22 is exactly equal to that of the illumination detector 20, namely L, and therefore the two detectors are assumed to have the same field of view. In operation when the sun image line 15 intersects the sun angle detector 22, i.e., is fully within the field of view, the output voltage at terminal 31a, designated $V_O$, is dependent on the position of the sun image line 15 on the sun angle detector. When the sun image line 15 is at the center of the field of view, the output voltage $V_O$ is zero. On the other hand, if the detector assembly 10 is oriented about the X axis with respect to the sun direction so that the sun image line 15 intersects the detector 22 above its center line, $V_O$ is positive, while being negative when the sun image line is below the center line. The magnitude of the output voltage $V_O$ is related to the off normal angle of the sun image line with respect to the normal, i.e., where the sun image line intersects the center of the sun angle detector.

However, when the sun image line is outside the field view of the sun angle detector the output voltage $V_O$ is indeterminant. The output voltage VO of the detector 22 and the resistance R of the detector 20, when both have the same field of view, assumed to be ±22°, is diagrammed in FIG. 3. Line 40 designates $V_O$. In practice the strip resistor 32 is deposited so that at either end thereof for a short length the output voltage $V_O$ is substantially constant. When the sun image line is outside the field of view of the sun angle detector 22, the output voltage $V_O$ is indeterminant, as designated by dashed lines 40a and 40b, which extend from line 40.

In FIG. 3, line 42a represents the low resistance when the sun image line 15 is fully within the field of view of detector 20. Line portions 42b indicate a very high resistance when the sun image line 15 is outside the field of view of detector 20, while line portions 42c and 42d indicate the change in resistance as the sun image line 15 enters the field of view of the illumination detector 20 from the bottom or the top end thereof. $R_T$ on line portions 42c and 42d represents a selected resistance trigger value.

When the output resistance of the illumination detector 20 equals $R_T$, it indicates that the sun image line is entering the field of view of the illumination detector. Alternately stated, when $R = R_T$ it indicates a sun acquisition signal, at the edge of the field of view of the illumination detector. However, it does not indicate the direction in which the sun image line enters the field of view. This is, it does not indicate whether the sun image line enters the field of view from the bottom or the top of the illumination detector. Such indication however is provided by the sun angle detector 22.

It was discovered that when the field of view of the illumination detector 20 is exactly equal to that of the sun angle detector 22, the sun acquisition signal ($R = R_T$) is sometimes produced when the output voltage $V_O$ of the sun angle detector 22 is indeterminant. Therefore, $V_O$ cannot be used to control the spacecraft position or to indicate the angle from the normal at which the sun image line 15 enters the housing 12. This is due to the fact that the sun image line moves on (or off) the end of both the illumination detector 20 and sun angle detector 22 simultaneously. Consequently, the sun acquisition signal sometimes occurs ($R = R_T$) before the sun angle detector's output stabilized at either $V_0 = +10v$ or $V_0 = -10v$, depending on the direction the sun image line enters the detectors field of view.

Figure 4:
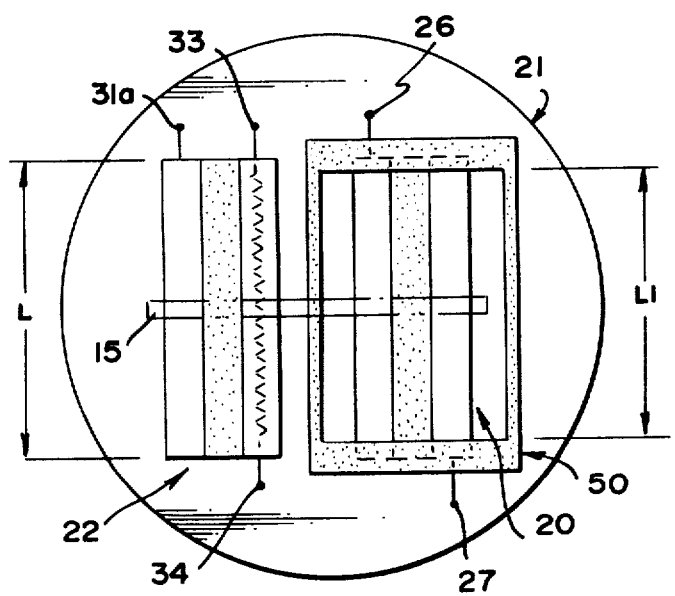
FIG. 4 is a top view similar to FIG. 2 except that the field of view of the illumination detector is less than that of the sun angle detector in accordance with the present invention.

This problem was overcome by effectively reducing the field of view of the illumination detector 20, with respect to the field of view of the sun angle detector 22, while retaining the centers of the two fields of view to be the same. In one embodiment this was achieved by applying a mask to block out the sun image line near the ends of the illumination detector 20 without blocking the sun image line from the sun angle detector 22. Such a mask is shown in FIG. 4 which is similar to FIG. 2 except for the addition of the mask 50, shown surrounding detector 20. The effect of the mask 50 is to reduce the field of view of detector 20 to L1 while the field of view of the sun angle detector 22 remains unchanged and is designated by L, where L > L1.

Figure 5:
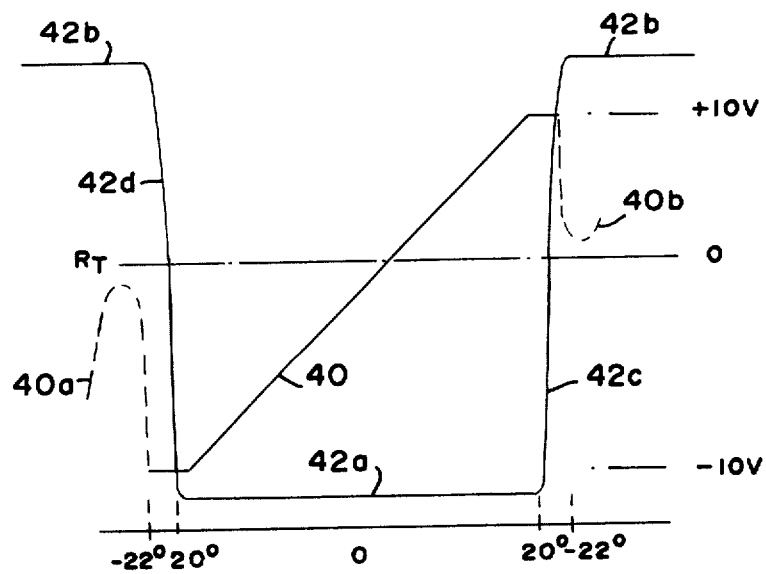
FIG. 5 is a waveform diagram of the outputs of the detectors shown in FIG. 4.

By reducing the effective field of view of the illumination detector 20 with respect to that of the sun angle detector the sun acquisition signal ($R = R_T$) always occurs when the output $V_O$ of the sun angle detector 22 is either +10v or −10v. This is diagrammed in FIG. 5 which is similar to FIG. 3 except that the field of view L1 of the illumination detector in terms of degrees is assumed to be ±20° while that of the sun angle detector is assumed to be ±22°, as shown in FIG. 3. Consequently, once the sun is acquired, i.e., $R = R_T$ the output voltage $V_O$ can then be used to control the vehicle attitude until $V_O$ equals the desired value between ±10v. If the desired sun direction is normal to the detector assembly, $V_O$ is used to control the vehicle attitude until $V_O = 0$.

Figure 6:
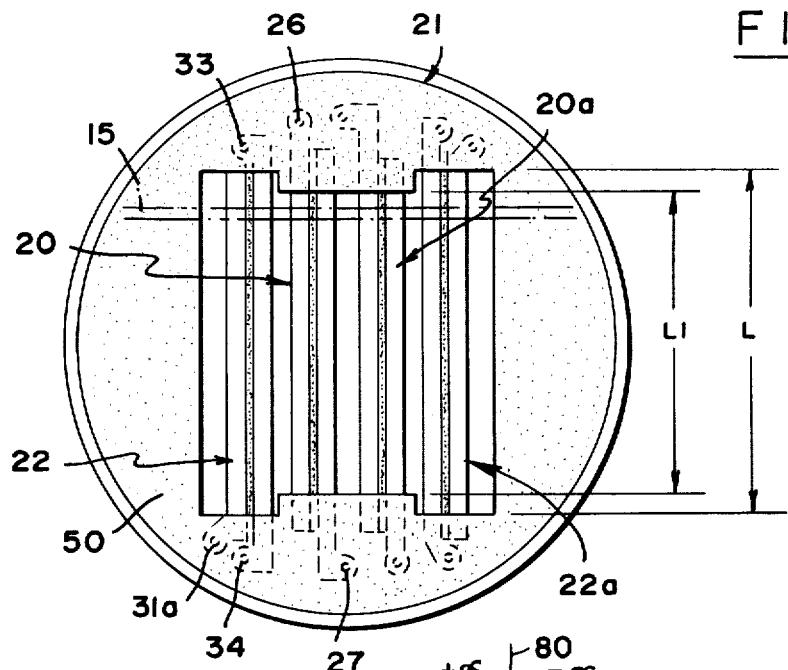
FIG. 6 is a top view of a detector assembly actually reduced to practice.

Attention is now directed to FIG. 6 which is a top view of an embodiment which was actually reduced to practice. This embodiment includes the illumination detector 20 and the sun angle detector 22 as previously described. In addition it includes a second pair of detectors, which consists of an illumination detector 20a, identical to detector 20 and a sun angle detector 22a identical to sun angle detector 22. The two inner detectors are the illumination detectors 20 and 20a while the two outer detectors are the sun angle detectors 22 and 22a. A single mask 50 is used. As becomes apparent from FIG. 6 the fields of view of the illumination detectors 20 and 20a is smaller than that of the sun angle detectors 22 and 22a.

In operation the outputs of only one illumination detector and one sun angle detector are used. The other two detectors are provided for redundancy purposes in case one of the detector's becomes inoperative, i.e., fails for some reason. In the vehicle in which the novel detection system is incorporated, the sun is acquired within the field of view by rotating the vehicle about the sensitive axis X (see FIG. 1) until the sun acquisition signal is produced, i.e., $R = R_T$. Then the output $V_O$ of the sun angle detector (either 22 or 22a) is used.

Figure 7:
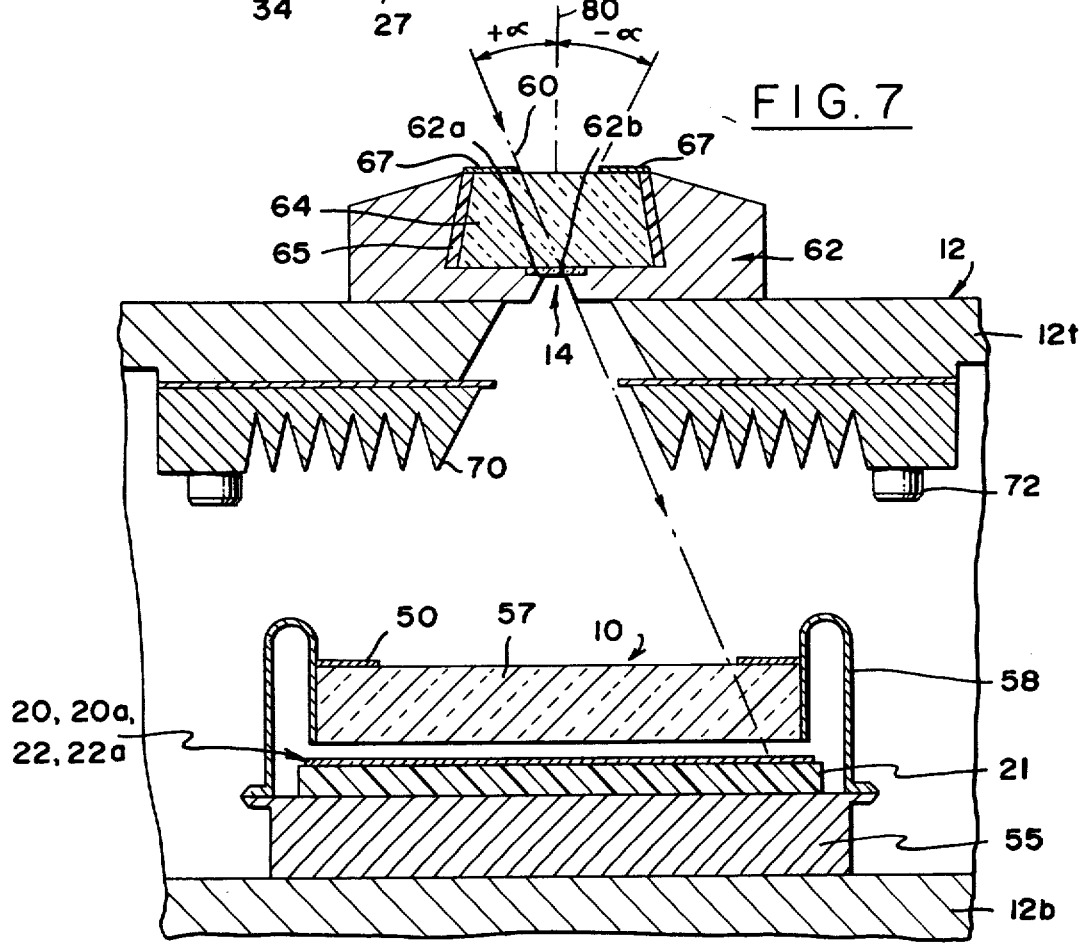
FIG. 7 is a cross sectional diagram of the detector arrangement of an embodiment actually reduced to practice.

FIG. 7 is a cross-sectional view of the detector assembly 10 and housing 12. As shown the detector assembly 10 includes the substrate 21 on which the detectors are deposited. The substrate 23 is supported on a back plate 55 which is in turn supported on the bottom side 12b of housing 12. Supported above the detectors is a detector window 57 by means of supports 58. The mask 50 is placed on top of the window 57. Sunlight represented by ray 60 is admitted into the housing 12 through its top side 12t by an optical assembly, consisting of an aluminum retainer 62 which is secured to the housing top side 12t. The retainer defines the slit 14 by two spaced apart knife edges 62a and 62b. Secured within the retainer 62 is a fused silica window 64 which is bonded to the retainer by a bonding compound 65. Field stops 67 are positioned on the top of window 64 to limit the field of view of the detector assembly. Also included in the housing 12 are stray light baffles 70 which are secured to the bottom side of housing top side 12t and face the detector assembly 10. The function of these baffles is to prevent any stray light which is directed outside the fields of view of the detectors from bouncing off the mask 50 and be reflected back to the detectors. The plate from which the baffles 70 extend is secured to top side 12t by screws 72. If desired the distance between the bottom and top sides 12b and 12t of housing 12 may be adjustable to further control the fields of view of the detectors.

In FIG. 7 the dashed line 80 represents a normal direction, perpendicular to the plane of the detectors. The maximum field of view of the detector is represented by $2\alpha$, where $+\alpha$ represents an angle between the normal direction 80 and light entering the housing from a first direction on one side of the normal direction, such as from the left side. The angle $-\alpha$ represents an angle between the normal direction 80 and light entering the housing from a second direction on the other side of the normal direction 80, such as from the right side. It should be appreciated from the foregoing description, that the field of view of the illumination detector is less than that of the light angle detector. For explanatory purposes the field of view of the illumination detector may be defined as $\pm Z°$ and that of the light angle detector as $\pm W°$, where $W > Z$. Thus for the illumination detector $\pm \alpha = \pm Z$ and for the light angle detector $\pm \alpha = \pm W$. In the foregoing example Z was assumed to be 20° and W 22°.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A light sensitive detector assembly comprising:
   a housing defining a single slit extending in a first direction;
   means associated with said slit for admitting light through said slit into said housing to form a light image extending in said first direction;
   a substrate in said housing having a top surface in a plane perpendicular to a direction, defined as a normal direction;
   an illumination detector on said substrate for providing a substantially constant low resistance output, definable as $R_s$, when the light image enters said housing in a direction within $[\pm X°] \pm Z°$ with respect to said normal direction, and for providing a substantially constant high resistance output, definable as $R_h$, where $R_h > R_s$, when the light image enters said housing in a direction which forms an angle greater than $[X°]$ $Z°$ with respect to said normal direction; and
   a light angle detector disposed on said substrate parallel to said illumination detector for providing a first output when the light image enters said housing from a direction which is on the other side of said normal direction, forming an angle, definable as $-W°$ therewith, and for providing an output which is between the said first and second outputs when the angle between the normal direction and the light image direction is between $+W°$ and $-W°$ where $[W>X]$ $W>Z$.

2. The assembly as described in claim 1 wherein said first output of said light angle detector is a voltage of a selected amplitude and of a first polarity and the second output is a voltage of said selected amplitude and of a second polarity, opposite said first polarity, whereby the output is substantially equal to zero volt when the light image is directed to said light angle detector in a direction coinciding with the normal direction.

3. The assembly as described in claim 1 wherein the output resistance of said illumination detector varies from $R_h$ to $R_s$ when the output of said light angle detector is either said first output or said second output.

4. The assembly as described in claim 3 wherein said first output of said light angle detector is a voltage of a selected amplitude and of a first polarity and the second output is a voltage of said selected amplitude and of a polarity opposite said first polarity, whereby the output is substantially equal to zero volt when the light image is directed to said light angle detector in a direction coinciding with the normal direction.

5. The assembly as described in claim 1 wherein said illumination detector comprises first and second elongated spaced apart strips of low resistance material deposited on said substrate and extending in a second direction, perpendicular to said first direction, and a third elongated strip of photoconductive material extending between and in contact with said first and second strips, with the light image being in a direction transverse to the length of said strips, whereby when the light image impinges the third strip between said first and second strips it provides a low resistance path therebetween, so that the resistance between said first and second strips is $R_s$, and in the absence of the light image impinging said third strip the latter provides a high resistance between said first and second strips, the resistance between which is $R_h$.

6. The assembly as described in claim 5 wherein said light angle detector comprises a first elongated strip of low resistance material extending in said second direction parallel to the strips of said illumination detector, an elongated resistor, defining a second elongated strip, parallel to and spaced apart from said first strip and a third elongated strip of photoconductive material in contact with said first and second strips, said resistor, defining said second strip, being connected to potentials at opposite ends thereof whereby the output potential at said first strip is a function of the position at which the light image impinges the third strip along its length when the direction of the light image entering said housing is within $\pm W°$ with respect to the normal direction.

7. The assembly as described in claim 6 wherein one end of said resistor, defining said second strip, is connected to a dc voltage of a selected amplitude and of a first polarity and the second end is connected to a dc voltage of said selected amplitude and of a second polarity, opposite said first polarity, whereby when the light image enters said housing at an angle of $+W°$ the light image impinges the third strip of said light angle detector, so that the voltage at said first strip is substantially equal to said selected amplitude and is of said first polarity, and when the light image enters said housing at an angle of $+W°$ the light image impinges the other end of said third strip so that the voltage at said first strip is substantially equal to said selected amplitude but is of said second polarity, with the output of said first strip being substantially equal to zero volt when the light image enters said housing in the normal direction.

8. The assembly as described in claim 7 wherein the voltage at said first strip of said light angle detector is of said selected amplitude and is either of said first polarity or said second polarity when the resistance of said illumination detector changes between $R_s$ and $R_h$.

9. The assembly as described in claim 8 wherein W-Z is on the order of not more than 5°.

10. A sun direction detection system comprising:
a housing defining a single slit extending in a first direction;
a substrate in said housing defining a top flat surface in a plane perpendicular to a direction, defined as the normal direction;
an illumination detector deposited on said substrate and characterized by a field of view definable as $\pm Z°$ with respect to said normal direction for providing a low resistance output, definable as $R_s$, when sunlight is directed to said illumination detector through said slit, with the sunlight direction from either side of said normal direction forming an angle not greater than $Z°$ with respect to said normal directon, and for providing a high resistance output definable as $R_h$, where $R_h >> R_s$ when the sunlight is directed to said illumination detector through said slit, with the sunlight direction forming an angle greater than $Z°$ with respect to said normal direction; and a sun angle detector deposited on said substrate and characterized by a field of view definable as $\pm W°$ with respect to said normal direction for providing an output which is a function of the direction of the sunlight directed thereto through said slit with respect to said normal direction when the angle of the sunlight direction with respect to said normal direction is not greater than $W°$, with the field of view of said sun angle detector being greater than the illumination detector field of view.

11. The assembly as directed in claim 10 wherein said illumination detector comprises first and second elongated spaced apart strips of low resistance material deposited on said substrate and extending in a second direction, perpendicular to said first direction, and a third elongated strip of photoconductive material extending between and in contact with said first and second strips, with the sunlight directed to said illuminatin detector being in a direction transverse to the length of said strips, whereby when the sunlight impinges the third strip between said first and second strips it provides a low resistance path therebetween, so that the resistance between said first and second strips is $R_s$, and in the absence of the sunlight impinging said third strip the latter provides a high resistance between said first and second strips, the resistance between which is $R_h$.

12. The assembly as described in claim 11 wherein said sun angle detector comprises a first elongated strip of low resistance material extending in said second direction parallel to the strips of said illumination detector, an elongated resistor, defining a second elongated strip, parallel to and spaced apart from said strip and a third elongated strip of photoconductive material in contact with said first and second strips, said resistor, defining said second strip, being connected to potentials at opposite ends thereof whereby the output potential at said first strip is a junction of the position at which the sunlight impinges the third strip along its length when the direction of the sunlight entering said housing is within $\pm W°$ with respect to the normal direction.

13. The assembly as described in claim 12 wherein one end of said resistor, defining said second strip, is connected to a dc voltage of a selected amplitude and of a first polarity and the second end is connected to a dc voltage of said selected amplitude and of a second polarity, opposite said first polarity, whereby when the sunlight enters said housing at an angle of $+W°$ the sunlight impinges the third strip of said sun angle detector, so that the voltage at said first strip is substantially equal to said selected amplitude and is of said first polarity, and when the sunlight enters said housing at an angle of $-W°$ the sunlight impinges the other end of said third strip so that the voltage at said first strip is substantially equal to said selected amplitude but is of said second polarity, with the output at said first strip being substantially equal to zero volt when the sunlight enters said housing in the normal direction.

14. The assembly as described in claim 13 wherein the voltage at said first strip of said sun angle detector is of said selected amplitude and is either of said first polarity or said second polarity when the output resistance of said illumination detector changes between $R_s$ and $R_h$.

* * * * *